Patented Apr. 18, 1933

1,904,820

UNITED STATES PATENT OFFICE

RAINALD BRIGHTMAN, OF MANCHESTER, ENGLAND, ASSIGNOR TO IMPERIAL CHEMICAL INDUSTRIES LIMITED, A CORPORATION OF GREAT BRITAIN

AZO DYE

No Drawing. Application filed June 30, 1930, Serial No. 465,064, and in Great Britain July 3, 1929.

According to this invention new azo dyestuffs which have the valuable property of dyeing a regenerated cellulose silk in even shades are obtained by tetrazotizing an amino-benzoyl-phenylene-diamine, or a derivative thereof, having the general structure,

$NH_2.C_6H_4.CO.NH.C_6H_4.NH_2$, such as is obtained by the processes of D. R. P. 221,433, and coupling with one molecule of a 2:8-, 1:8-, or 1:5-amino-naphthol mono or di-sulphonic acid or an N-substituted or azo derivative thereof and one molecule of a coupling component other than 2-amino-5-naphthol-7-sulphonic acid or a derivative thereof containing a heteronuclear substituted amino group. Alternatively I may obtain certain of the same dyestuffs by coupling a diazotized amino acetanilide or nitroaniline, or substitution product thereof, with a suitable coupling component, as indicated above (the coupling component used with diazotized amino-acetanilides should not contain an unsubstituted or acylated amino group; the coupling component used with diazotized nitroanilines should not contain a nitro group nor an unsubstituted amino group), converting the azo dyestuff thus obtained, by hydrolysis or reduction, into an amino-azo-dyestuff, treating the resultant dyestuff with a nitro-benzoyl chloride, reducing the nitro-azo dyestuff to a new aminobenzoyl azo dyestuff, and diazotizing and coupling with a coupling component, as already indicated.

The dyes may be represented by the general formula

$R-N=N-C_6H_4.CO.NH.C_6H_4-N=N-R'$ in which R represents an organic residue of a 2:8-, 1:8-, or 1:5-amino-naphthol mono or di-sulphonic acid or an N-substituted or an azo derivative thereof and R' represents the residue of an aromatic coupling component other than 2-amino-5-naphthol-7-sulphonic acid or a derivative thereof containing a heteronuclear substituted amino group.

The following examples illustrate the invention without limiting it. The parts are by weight.

Example I 227 parts of meta-amino-benzoyl-meta-phenylene-diamine of M. P. 130° C., are tetrazotized with 500 parts of 36% hydrochloric acid and 138 parts of sodium nitrite and the solution of tetrazo compound is stirred into a solution of 138 parts of salicylic acid containing 600 parts of sodium carbonate, cooled in ice. After stirring a short time, a solution containing 337 parts of sodium 2-phenylamino-8-naphthol-6-sulphonic acid is run in and stirring is continued until coupling is complete.

The dye prepared by Example I probably has the formula:

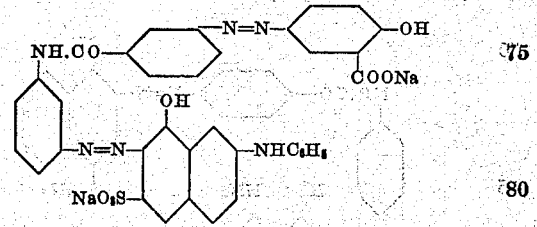

Example II 227 parts of m-aminobenzoyl-p-phenylene-diamine, M. P. 150° C., are tetrazotized with 500 parts of 36% hydrochloric acid and 138 parts of sodium nitrite and the solution of tetrazo compound is run into a cold, well stirred solution containing 319 parts of 1:8- amino-naphthol-2:4-disulphonic acid containing 600 parts of sodium carbonate. After stirring a short time there is added a solution containing 144 parts of B-naphthol dissolved in 40 parts of sodium hydroxide. The coupling is maintained alkaline and when combination is complete, the mixture is heated up and the dyestuff precipitated by the addition of common salt. It dyes viscose in bluish red shades.

The dye prepared by Example II probably has the formula:

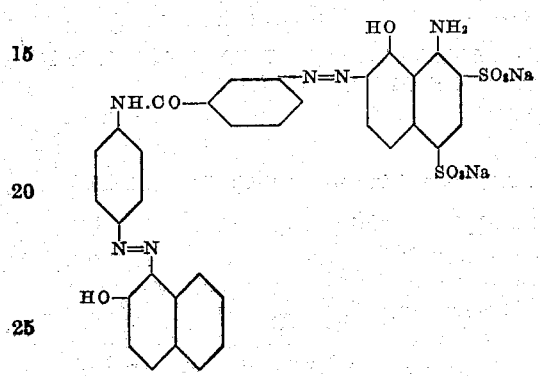

Example III 227 parts of p-amino-benzoyl-p-phenylene-diamine, M. P. 205° C., are tetrazotized with 500 parts of 36% hydrochloric acid and 138 parts of sodium nitrite and the tetrazo solution is run with stirring into a cold solution containing 224 parts of 1-naphthol-4-sulphonic acid and 600 parts of sodium carbonate. After stirring a short time a neutral solution containing 239 parts of 1:8-amino-naphthol-4-sulphonic acid is added and stirring is continued until coupling is complete, the mixture being maintained cold and alkaline by the addition of further ice or sodium carbonate if required. The resulting mixture is then heated up and the dyestuff isolated by the addition of common salt. It dyes viscose silk a reddish violet shade.

For Example III the dye probably has the formula:

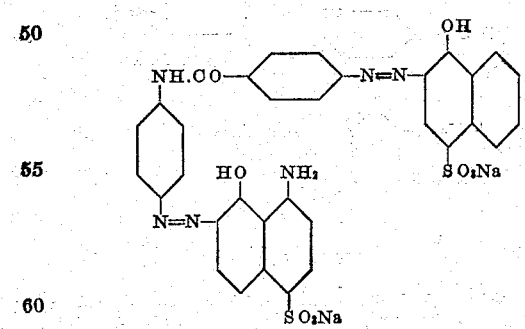

Example IV 241 parts of m-amino-benzoyl-m-toluylene-diamine, M. P. 177° C., are tetrazotized with 138 parts of sodium nitrite and 500 parts of 36% hydrochloric acid. The tetrazo solution is run into a solution containing 251 parts of sodium 2-amino-8-naphthol-6-sulphonate and about 300 parts of sodium acetate crystals. The coupling mixture is kept free from mineral acidity and after stirring cold for some hours it is made alkaline by the addition of sodium carbonate and a solution of 224 parts 1-naphthol-5-sulphonic acid is added. The coupling mixture is maintained alkaline and is stirred until combination is complete when it is heated up and the dyestuff isolated by the addition of common salt. It dyes viscose silk in bluish red shades.

For Example IV the dye probably has the formula:

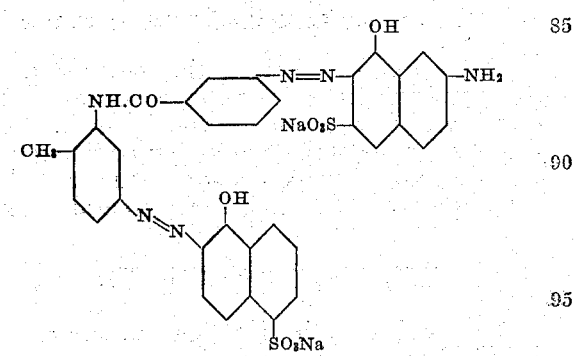

Example V 227 parts of m-amino-benzoyl-p-phenylene-diamine are tetrazotized in the usual way with 138 parts of sodium nitrite, and 600 parts of 36% hydrochloric acid, and the tetrazo solution is stirred into a cold solution containing 160 parts of sodium salicylate and 600 parts of sodium carbonate. After stirring a short time there is added a faintly alkaline solution of the monoazo dyestuff obtained by diazotizing 138 parts of p-nitro-aniline and combining in acid solution with 319 parts of 1:8-amino-naphthol-3:6-disulphonic acid in the known manner. The mixture is stirred until coupling is complete, it is then heated up and the dyestuff salted out by the addition of common salt. It dyes viscose silk in bluish green shades.

For Example V the dye probably has the formula:

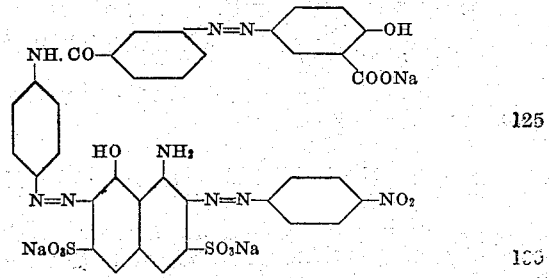

TABLE I

| | Diamine tetrazotized | First coupling component | Second coupling component. (Coupled alkaline) | Shade on viscose rayon |
|---|---|---|---|---|
| (1) | m - aminobenzoyl - m - phenylenediamine | 1-naphthol-4-sulphonic acid | 2-amino-8-naphthol-6-sulphonic acid | Brownish red |
| (2) | m - aminobenzoyl - p - phenylenediamine | 1-naphthol-4-sulphonic acid | 2-phenylamino-5-naphthol-7-sulphonic acid | Crimson |
| (3) | Do. | Salicylic acid | 1:8 - aminonaphthol - 3:6 - disulphonic acid | Claret |
| (4) | Do. | 1-naphthol-4-sulphonic acid | 2 - phenylamino - 5 - naphthol - 7-sulphonic acid | Bluish-scarlet |
| (5) | p - aminobenzoyl - p - phenylenediamine | 2 - amino - 8 - naphthol - 6 - sulphonic acid (alk) | 1 - amino - 5 - naphthol - 7 - sulphonic acid | Claret |
| (6) | Do. | 2 - amino - 8 -naphthol - 6 - sulphonic acid (acid) | 1:8 - aminonaphthol - 3:6 - disulphonic acid | Maroon |
| (7) | 1 - m - aminobenzoyl - 2 - methoxy - 4-phenylenediamine | o-cresotinic acid | 2 - benzoylamino - 8 - naphthol - 6-sulphonic acid | Bluish red |

TABLE II

| Dyestuffs made from— | Hydrolyzed and condensed with— | Reduced, diazotized and coupled with— | Shade on viscose rayon |
|---|---|---|---|
| (1) 4-aminoacetanilide-3-sulphonic acid→ 1-naphthol-4-sulphonic acid | m-nitrobenzoyl chloride | 2 - phenylamino - 8 - naphthol - 6-sulphonic acid | Copper-red |

TABLE III

| Dyestuff made from— | Reduced and condensed with— | Reduced, diazotized and coupled with— | Shade on viscose rayon |
|---|---|---|---|
| (1) p-nitroaniline-o-sulphonic acid→ 1-naphthol-4-sulphonic acid | m-nitrobenzoylchloride | 1 - amino - 8 - naphthol - 4 - sulphonic acid | Blue |
| (2) p-nitroaniline→salicylic acid | Do. | 2 - benzoylamino - 5 - naphthol - 7-sulphonic acid | Orange brown |
| (3) m-nitroaniline→ salicylic acid | p-nitrobenzoylchloride | 1:8 - aminonaphthol - 2:4 - disulphonic acid | Red violet |

TABLE IV

| Dyestuff made from— | Condensed with— | Reduced, diazotized and coupled with— | Shade on viscose rayon |
|---|---|---|---|
| (1) m-amino-p-cresol methylether→ m-amino-p-cresol-methyl ether | p-nitrobenzoylchloride | 1:8 - aminonaphthol-3:6-disulphonic acid | Greenish-blue |
| (2) p-chloraniline-o-sulphonic acid→ m-amino-p-cresol-methylether | Do. | 1:8 - aminonaphthol-2:4-disulphonic acid | Greenish-blue |

It will be obvious that the above examples are furnished by way of illustration merely and that it is not the intention that applicant be limited to the exact conditions set forth therein. Obviously many other coupling components than those specified may be employed. Thus, as first components among compounds having the structure $$NH_2.C_6H_4.CO.NH.C_6H_4.NH_2$$

it is intended to include alkyl substituted compounds of the type illustrated in Example IV. In place of salicylic acid, other aromatic hydroxy acids and their alkali metal salts may be employed and in place of the particular naphthol sulphonic acids mentioned others may be substituted.

As many apparent and widely different embodiments of this invention may be made without departing from the spirit thereof, it is to be understood that I do not limit myself to the foregoing examples or description except as indicated in the following claims.

I claim:
1. The process of making a new azo dyestuff which comprises tetrazotizing an aminobenzoyl phenylene-diamine compound, coupling the resulting tetrazo compound with a compound of the group consisting of 2:8, 1:8, 1:5 amino-naphthol-sulphonic acids and N-substituted and benzene azo derivatives thereof and with a coupling component selected from the group consisting of an aromatic compound of the benzene and a compound of the naphthalene series consisting of the napthols and their sulfonic acids, the napthylamines and their sulphonic acids, the 2:8-, 1:8-, 1:5-amino - naphthol - sulfonic acids and their N-substituted derivatives.

2. The process of making a new azo dyestuff which comprises tetrazotizing a compound having the general structure $$NH_2.C_6H_4.CO.NH.C_6H_4.NH_2$$

coupling the resulting tetrazo compound with a compound of the group consisting of salicylic acid, sodium salicylate, B-naphthol, 1-naphthol-4-sulphonic acid and 1-naphthol-5-sulphonic acid and with a compound of the group consisting of 2-phenylamino-8-naphthol-6-sulphonic acid, 1:8-amino-naphthol-2:4-disulphonic acid, 1:8-amino-naphthol-4-sulphonic acid, 2-amino-8-naphthol-6-sulphonic acid and the mono-azo dye resulting from combining diazotized p-nitroaniline in acid solution with 1:8-amino-naphthol-3:6-disulphonic acid.

3. A dyestuff having the general formula $$R-N=N-C_6H_4.CO.NH.C_6H_4-N=N-R'$$

in which R represents an organic residue of a 2:8-, 1:8-, or 1:5-amino-naphthol-sulfonic acid or an N-substituted or a benzene azo derivative thereof and R' represents the residue of a coupling component selected from the group consisting of an aromatic compound of the benzene series and a compound of the naphthalene series consisting of the naphthols and their sulfonic acids, the naphthylamines and their sulfonic acids, the 2:8-, 1:8-, 1:5-amino-naphthol-sulfonic acids and their N-substituted derivatives.

In testimony whereof I have signed my name to this specification.

RAINALD BRIGHTMAN.